(12) United States Patent
Brusson et al.

(10) Patent No.: US 6,221,801 B1
(45) Date of Patent: *Apr. 24, 2001

(54) CATALYST COMPONENT FOR THE POLYMERIZATION OF OLEFINS, PROCESS FOR ITS MANUFACTURE AND PROCESS FOR THE POLYMERIZATION OF OLEFINS IN THE PRESENCE OF THE SAID CATALYST COMPONENT

(75) Inventors: Jean-Michel Brusson, Idron; Laurent Duranel, Arthez de Bearn, both of (FR)

(73) Assignee: Appryl S.N.C., Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/573,129

(22) Filed: Dec. 15, 1995

(30) Foreign Application Priority Data

Dec. 16, 1994 (FR) .................................................. 94 15171

(51) Int. Cl.$^7$ ....................................................... C08F 4/64
(52) U.S. Cl. ..................... 502/104; 502/126; 502/127; 526/123; 526/125; 526/351; 526/352; 526/352.2
(58) Field of Search ..................................... 502/104, 126, 502/127; 526/123, 125

(56) References Cited

U.S. PATENT DOCUMENTS

| | | | |
|---|---|---|---|
| 4,226,741 | 10/1980 | Luciani et al. | 252/429 |
| 4,277,589 | * 7/1981 | Giannini et al. | 526/125.3 |
| 4,331,561 | 5/1982 | Luciani et al. | 252/429 |
| 4,409,378 | 10/1983 | Asanuma et al. | 526/125 |
| 4,829,038 | * 5/1989 | Hoppin et al. | 502/125 |
| 4,952,649 | * 8/1990 | Kioka et al. | 526/125.3 |
| 4,990,477 | 2/1991 | Kioka et al. | |
| 4,990,478 | 2/1991 | Hoppin et al. | 502/125 |
| 5,064,799 | * 11/1991 | Monte et al. | 502/115 |
| 5,189,124 | * 2/1993 | Sasaki et al. | 526/125.6 |
| 5,212,132 | * 5/1993 | Spitz et al. | 502/134 |
| 5,247,031 | * 9/1993 | Kioka et al. | 526/125 |
| 5,438,110 | * 8/1995 | Ishimaru et al. | 526/125.3 |
| 5,599,760 | 2/1997 | Brun et al. | 502/115 |

FOREIGN PATENT DOCUMENTS

| | | | |
|---|---|---|---|
| 41 1483A1 | 5/1991 | (DE) | . |
| 0 029 232 | 11/1980 | (EP) | . |
| 0 045 976 A2 | 8/1981 | (EP) | . |
| 45977 | * 8/1981 | (EP) | 526/125.3 |
| 0 125 911 A1 | 5/1984 | (EP) | . |
| 0 267 576 A2 | 11/1987 | (EP) | . |
| 0 282 341 | 3/1988 | (EP) | . |
| 0 344 755 A1 | 5/1989 | (EP) | . |
| 0 350 170 | 6/1989 | (EP) | . |
| 0 360 491 A2 | 9/1989 | (EP) | . |
| 0 371 664 A2 | 11/1989 | (EP) | . |
| 0 385 765 A2 | 2/1990 | (EP) | . |
| 0 395 083 A2 | 4/1990 | (EP) | . |
| 0 410 443 A1 | 7/1990 | (EP) | . |
| 0 437 264 A1 | 1/1991 | (EP) | . |
| 0 473 899 A2 | 7/1991 | (EP) | . |
| 0 488 537 A2 | 11/1991 | (EP) | . |
| 0 601 496 A1 | 12/1993 | (EP) | . |
| 4136006 | 9/1990 | (JP) | . |
| 4-331210 | 11/1992 | (JP) | . |
| WO 91/14718 | 3/1991 | (WO) | . |

OTHER PUBLICATIONS

Database WPI, Derwent Publications Ltd., London, GB; AN 93–003886.

Macromolecular Symposia, vol. 89, Jan. 1995, pp. 125–138, Peter Tait, "Comparative Kinetic and Active Active Centre Studies on Magnesium . . . ".

* cited by examiner

*Primary Examiner*—Bernard Lipman
(74) *Attorney, Agent, or Firm*—Smith, Gambrell & Russell, LLP

(57) ABSTRACT

The present invention relates to a solid catalyst component for the polymerization of olefins, making it possible to obtain polymers or copolymers exhibiting a high Mz/Mw, generally higher than 3, and a high Mw/Mn, generally higher than 5.5. In the solid component according to the invention, titanium is present in a proportion of at least 2.5% by weight and a diester of phthalic acid is present in a proportion of less than 7% by weight.

38 Claims, No Drawings

CATALYST COMPONENT FOR THE POLYMERIZATION OF OLEFINS, PROCESS FOR ITS MANUFACTURE AND PROCESS FOR THE POLYMERIZATION OF OLEFINS IN THE PRESENCE OF THE SAID CATALYST COMPONENT

FIELD OF THE INVENTION

The present invention relates to a new solid catalyst component for the polymerization of olefins, making it possible to synthesize polyolefins with broadened molecular mass distributions.

BACKGROUND OF THE INVENTION

The present invention also relates to a process for the manufacture of the said solid catalyst component and to a process for the polymerization of olefins in the presence of the said solid catalyst component.

For the manufacture of polyolefin films it is preferable to have available polyolefins exhibiting broadened molecular masses. The polyolefin intended to be converted into film must preferably contain molecules of high molecular mass because these are the molecules that ensure the continuity of the film and prevent its tearing when it is stretched. A polyolefin contains molecules of high molecular mass if the ratio of the z-average molecular mass (denoted by Mz) to the weight-average molecular mass (denoted by Mw) is high. If the polyolefin contained only molecules of high molecular mass, its conversion into film would become difficult, given the high temperatures needed for its manufacture. This is why it is preferable that the polyolefin should also contain molecules of low molecular mass. A polyolefin contains molecules of low molecular mass if the ratio of the weight-average molecular mass (de noted by Mw) to the number-average molecular mass (denoted by Mn) is high and for example higher than 5.5.

It is desirable, moreover, to improve the filmability further by reducing the crystallinity of the polyolefin.

In fact, the reduction in crystallinity is reflected, on the one hand, in a lowering of the modulus of elasticity, which decreases the stiffness of the film and improves its resistance to stresses during stretching or in its final use, and, on the other hand, in a reduction in the effect of temperature on the rheological properties of the material being stretched, and this makes it easier to control the quality of the final product.

A polyolefin is less crystalline if it has a high solubility in heptane. For the film application, therefore, preference is given to a polyolefin exhibiting a low value of insolubility in heptane (represented by HI, from the expression "heptane-insoluble"), for example lower than 97% by weight and, better, lower than 94% by weight.

However, this value must not be too low because otherwise the polymer is tacky and consequently becomes difficult to transport. This value is preferably higher than 80% by weight and, still more preferably, higher than 90% by weight.

The synthesis of polyolefins containing molecules of high mass and molecules of low mass at the same time, if appropriate exhibiting an HI that is appropriate in the sense referred to above, using a productive process, that is to say in which the product efficiency is as high as possible and, in the case of propylene polymerization, is at least 20 000 grams of polymer per gram of solid catalyst component per hour, is particularly difficult without resorting to mixing subsequent to the manufacture of the polyolefins.

Patent Application EP 0385 765 A2 teaches that it is possible to broaden the molecular mass distribution of polypropylene by introducing two kinds of silanes into the polymerization mixture. This document describes polymerizations in the presence of catalyst components containing 2.5% by weight of titanium and 13.8% by weight of diisobutyl phthalate.

Patent Application EP 0350170 teaches that highly isotactic polypropylene can be obtained by polymerization of propylene in the presence of a solid catalyst component containing 2.2% by weight of titanium and in the presence of a silane as an external electron-donor.

Patent Application WO 91/14718 shows that polypropylene with a broadened molecular mass distribution can be obtained by carrying out the polymerization with the aid of a number of reactors mounted in cascade.

DESCRIPTION OF THE INVENTION

The present invention relates to a solid catalyst component for the polymerization of olefins which makes it possible to obtain polymers or copolymers exhibiting a high Mz/Mw, generally higher than 3, and a high Mw/Mn, generally higher than 5.5. In addition, when they originate from at least one monomer containing at least three carbon atoms, these polymers or copolymers generally exhibit an HI ranging from 85 to 97% by weight and capable of ranging even from 90 to 94% by weight. In addition, the solid catalyst component according to the invention exhibits a high activity. These objectives are attained without it being necessary to introduce two silanes during the polymerization and without it being necessary to resort to a number of reactors mounted in cascade.

The solid catalyst component according to the invention includes magnesium, titanium and halogen, preferably chlorine, atoms and includes a diester of phthalic acid in which the hydrocarbon groups in the ester functional groups, which may be identical or different, are saturated, linear or branched and contain from one to eight carbon atoms, the titanium being in an at least partially halogenated, preferably chlorinated, form and in an oxidation state of three and/or four, and is characterized in that the titanium is present therein in a proportion of at least 2.5% by weight and in that the diester of phthalic acid is present therein in a proportion of less than 7% by weight.

The titanium content preferably ranges from 3 to 5% by weight.

The diester content is preferably higher than 2% by weight and, better, ranges from 3 to 6% by weight.

The diester of phthalic acid may be chosen, for example, from the following compounds: diethyl phthalate, diisobutyl phthalate, di-n-butyl phthalate, dihexyl phthalate and dioctyl phthalate.

The preferred diesters are dibutyl phthalates.

It is not ruled out for the catalyst component according to the invention to contain a Lewis base not forming part of the class of the diesters entering within the composition of the catalyst component according to the invention. This Lewis base may be a liquid or solid organic compound known for entering within the composition of the catalyst components of Ziegler-Natta type. This Lewis base may be chosen from aliphatic or aromatic carboxylic acids and their alkyl esters, aliphatic or cyclic ethers, ketones, vinyl esters, acrylic derivatives, in particular alkyl acrylates or alkyl methacrylates, and alcohols. Particularly suitable as a Lewis base are compounds such as methyl para-toluate, ethyl benzoate, ethyl or butyl acetate, ethyl ether, ethyl para-anisate, tetrahydrofuran, dioxane, acetone, methyl isobutyl ketone, vinyl acetate, methyl methacrylate, ethanol and butanol. This Lewis base may be present in the catalyst component according to the invention in a proportion of 0.01 to 8% by weight. Tetrahydrofuran (THF) is a preferred Lewis base.

Tetrahydrofuran is preferably present in a proportion of 0.3 to 1% by weight in the solid catalyst component according to the invention.

Any known techniques for manufacturing solid catalyst components of Ziegler-Natta type, containing magnesium, halogen and titanium atoms and an ester of phthalic acid, may be adapted for the synthesis of the catalyst component according to the invention, so long as these processes can be modified in respect of the quantity of the titanium derivative which is introduced and in respect of the quantity of ester of phthalic acid which is introduced, so as to obtain the contents of titanium and of the diester of phthalic acid characterizing the solid catalyst component according to the invention. By employing the techniques which are known in their principle in order to produce catalyst components of Ziegler-Natta type, a person skilled in the art can produce the catalyst component according to the invention after having carried out a few routine tests concerning essentially the quantity of the titanium derivative and the quantity of the diester of phthalic acid to be used, so as to arrive at the solid catalyst component according to the invention. The solid catalyst component is preferably based on $MgCl_2$, that is to say it contains at least 60% by weight of $MgCl_2$. This is generally obtained when $MgCl_2$ is employed as support for the catalyst component.

The solid catalyst component according to the invention may be the result of the combination of at least one titanium compound, one magnesium compound, chlorine, optionally one aluminium compound, a diester of phthalic acid in which the hydrocarbon groups in the ester functional groups, which may be identical or different, contain from one to eight carbon atoms, optionally a Lewis base, and of any other compound usable in the solid components of Ziegler-Natta type.

The titanium compound may be chosen from the chlorine compounds of titanium of formula Ti—$(OR)_xCl_{4-x}$ in which R denotes an aliphatic or aromatic hydrocarbon radical containing from one to fourteen carbon atoms or denotes $COR^1$ with $R^1$ denoting an aliphatic or aromatic hydrocarbon radical containing from one to fourteen carbon atoms, and x denotes an integer ranging from 0 to 3.

The magnesium compound may be chosen from the compounds of formula $Mg(OR^2)_nCl_{2-n}$ in which $R^2$ denotes hydrogen or a linear or cyclic hydrocarbon radical and n denotes an integer ranging from 0 to 2.

The chlorine present in the solid catalyst component may originate directly from the titanium halide and/or from the magnesium halide. It may also originate from an independent chlorinating agent such as hydrochloric acid, silicon tetrachloride or an organic halide like butyl chloride.

Among the techniques which are suitable for the synthesis of the present solid component, preference is given to those involving bringing, on the o n e hand, a complex between $MgCl_2$ and a solvent which complexes $MgCl_2$, which is denoted by ($MgCl_2$.complexing solvent) into contact with, on the other hand, a titanium derivative and the diester of phthalic acid. if the complexing solvent is a Lewis base capable of entering within the composition of the solid catalyst component according to the invention, part of this complexing solvent may be left in the said component to act as a Lewis base. The solid catalyst components produced in this way are based on $MgCl_2$ in the sense that they generally contain at least 60% by weight of $MgCl_2$, which acts as support.

If a Lewis base B chosen in order to be incorporated into the solid catalyst component according to the invention is a solvent which complexes $MgCl_2$, and if a choice is made to produce the solid component by involving the bringing into contact which has just been described, it is preferable for the purpose of the said bringing into contact to employ a ($MgCl_2$.B) complex in which the molar ratio of B to $MgCl_2$ is between 1 and 2 and, better, between 1.4 and 1.7. To obtain such a complex it is preferable to place $MgCl_2$ in the presence of B so that the molar ratio of B to $MgCl_2$ is higher than 4 and, still more preferably, higher than 7, and then to wash the solid thus obtained with the aid of a solvent S to arrive at the desired ratio in the complex before bringing into contact. Placing the $MgCl_2$ in the presence of B may be carried out at a temperature of between $T_b$ −30° C. and $T_b$ +40° C., $T_b$ denoting the boiling temperature of B at atmospheric pressure. It may be carried out in the presence of an inert solvent, but this inert solvent is preferably not present in a greater mass than that of B. The solvent S preferably dissolves less than 1000 ppm of $MgCl_2$ at the washing temperature but is miscible with the Lewis base B at the said washing temperature. Aliphatic, alicyclic or aromatic hydrocarbons such as heptane, hexane, cyclohexane, toluene, xylene and benzene may be mentioned as solvent S. Washing with S may be carried out at a temperature between 20 and 150° C. and, better, between 50 and 80° C.

In particular, this latter technique is preferable to that consisting in impregnating $MgCl_2$ with the Lewis base B so as to obtain directly a support based on $MgCl_2$ containing the desired concentration of Lewis base B before bringing into contact.

The diester of phthalic acid may be brought into contact with the ($MgCl_2$.complexing solvent) complex before, after or at the same time as the titanium derivative. The principle of this technique is described in Patent Application EP 488 856. In relation to the technique described in this document it is appropriate to modify the quantities of the titanium derivative and of the diester of phthalic acid so as to arrive at the composition of the $MgCl_2$ catalyst component according to the invention.

Dioxane may be employed as complexing solvent for $MgCl_2$, but tetrahydrofuran is preferred, which is also a preferred Lewis base.

The present invention also relates to a process for the polymerization of at least one olefin in the presence of the catalyst component according to the invention.

When the polymerization mixture contains an olefin containing at least three carbon atoms, such as propylene, the polymerization mixture preferably contains a silane of formula $SiR^1R^2R^3R^4$ in which at least one of the groups bonded to the silicon is an alkoxy group of formula (—$OR^5$) in which $R^5$ denotes a linear saturated hydrocarbon group containing 1 to 4 carbon atoms and preferably 1 or 2 carbon atoms, the other groups bonded to the silicon being hydrocarbon groups preferably containing 1 to 8 carbon atoms, at least one of these groups containing at least four carbon atoms. If it is desired to obtain a polymer or copolymer with the HI higher than 90% by weight, it is preferred that two of the groups bonded to silicon, which may be identical or different, are alkoxy groups of formula (—$OR^5$) as defined above, and, still more preferably, in addition to the presence of the two alkoxy groups, at least one of the groups bonded to silicon is a cyclopentyl radical. Preferred silanes which may be mentioned are methylcyclopentyldimethoxysilane, ethylcyclopentyldimethoxysilane, isopropylcyclopentyldimethoxysilane, isobutylcyclopentyldimethoxysilane, and dicyclopentyldimethoxysilane.

The silane is generally introduced in a proportion of $1 \times 10^{-4}$ to 0.2 millimoles per mole of olefin to be polymerized or copolymerized.

When it is an organic aluminium derivative that is present in the polymerization mixture as cocatalyst (see below), it is preferred to introduce the silane in a quantity such that the Al/Si molar ratio is between 5 and 200 and, still better, between 10 and 80.

When the polymerization mixture contains an olefin containing at least three carbon atoms, like propylene, the combination, on the one hand, of a solid catalyst component according to the invention containing from 3 to 5% by weight of titanium, from 3 to 6% of the diester of phthalic acid and from 0.3 to 1% by weight of tetrahydrofuran and, on the other hand, of dicyclopentyldimethoxysilane as external electron donor in the polymerization mixture and of an organic aluminium derivative as cocatalyst in the polymerization mixture, is a preferred combination because this combination makes it possible to obtain an excellent set of properties.

Polymers may be obtained by polymerization of at least one olefin in the presence of the catalyst component according to the invention by suspension, solution, gas-phase or bulk processes. The olefins which can be employed for the polymerization are, for example, the olefins containing from two to twenty carbon atoms and in particular the alpha-olefins of this group. Olefins which may be mentioned are ethylene, propylene, 1-butene, 4-methyl-1-pentene, 1-octene, 1-hexene, 3-methyl-1-pentene, 3-methyl-1-butene, 1-decene, 1-tetradecene or mixtures thereof. The term polymerization which is used in the present application therefore covers copolymerization reactions and the term polymer covers copolymers.

Among the alpha-olefin mixtures preference is given to a mixture of ethylene and of at least one alpha-olefin containing from three to eight carbon atoms, the percentage of ethylene in the mixture being generally higher than 90% by weight.

The polymers obtained generally have a weight-average molecular mass of between 80,000 and 400,000 grams per mole.

A bulk polymerization process consists in carrying out a polymerization in at least one of the olefins to be polymerized, which is kept in the liquid or supercritical state.

Solution or suspension polymerization processes consist in carrying out a polymerization in solution or in suspension in an inert medium and especially in an aliphatic hydrocarbon.

In the case of a solution polymerization process it is possible, for example, to employ a hydrocarbon containing from eight to twelve carbon atoms or a mixture of these hydrocarbons. In the case of a suspension polymerization process it is possible to employ, for example, n-heptane, n-hexane, isohexane or isobutane.

The operating conditions for these bulk, solution, suspension or gas-phase polymerization processes are those usually proposed for similar cases making use of conventional catalyst systems of Ziegler-Natta type, whether supported or not.

For example, in the case of a suspension or solution polymerization process it is possible to operate at temperatures ranging up to 250° C. and at pressures ranging from atmospheric pressure to 250 bars. In the case of a polymerization process in liquid propylene medium the temperatures may range up to the critical temperature and the pressures may be between the atmospheric pressure and the critical pressure. In the case of a bulk polymerization process producing polyethylenes or copolymers in which ethylene predominates it is possible to operate at temperatures of between 130° C. and 350° C. and at pressures ranging from 200 to 3500 bars.

A gas-phase polymerization process may be applied with the aid of any reactor permitting a gas-phase polymerization and in particular in a reactor with an agitated bed and/or with a fluidized bed.

The conditions of application of the gas-phase polymerization, especially temperature, pressure, injection of the olefin or of the olefins into the reactor with an agitated bed and/or with a fluidized bed and control of the polymerization temperature and pressure, are similar to those proposed in the prior art for the gas-phase polymerization of olefins. The operation is generally carried out at a temperature lower than the melting point T. of the polymer or prepolymer to be synthesized, and more particularly between +20° C. and $(T_m-5)°$ C., and at a pressure such that the olefin or the olefins are essentially in vapor phase.

A cocatalyst capable of activating the titanium of the catalyst component according to the invention must be present during the polymerization. This cocatalyst may be any cocatalyst for a solid catalyst component of Ziegler-Natta type. In particular this cocatalyst may be an organic aluminium derivative.

This organic aluminium derivative may be a derivative of formula $R^1R^2R^3Al$ in which each of $R^1$, $R^2$ and $R^3$, which may be identical or different, denotes either a halogen atom or an alkyl group containing from 1 to 20 carbon atoms, at least one of $R^1$, $R^2$ or $R^3$ denoting an alkyl group. Examples of suitable compounds which may be mentioned are ethylaluminium dichloride or dibromide, isobutylaluminium dichloride or dibromide, diethylaluminium chloride or bromide, di-n-propyl-aluminium chloride or bromide and diisobutylaluminium chloride or bromide. A trialkylaluminium such as tri-n-hexylaluminium, triisobutylaluminium, trimethylaluminium or triethylaluminium is employed in preference to the abovementioned compounds.

The cocatalyst may also be an aluminoxane. This aluminoxane may be linear, of formula

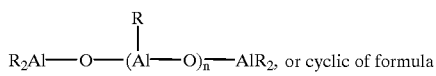

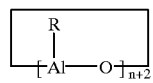

R denoting an alkyl radical containing from one to six carbon atoms and n being an integer ranging from 2 to 40, preferably from 10 to 20. The aluminoxane may contain groups R of different kinds. Preferably, all the groups R denote methyl groups. Furthermore, cocatalyst is also intended to mean mixtures of the abovementioned compounds.

EXAMPLES

The quantities of cocatalyst which are employed during the polymerization must be sufficient to activate the titanium. The quantity thereof which is introduced is generally such that the atomic ratio of the aluminium introduced by the cocatalyst to the titanium which it is desired to activate ranges from 0.5 to 10,000 and preferably from 1 to 1000.

The solution, suspension, bulk or gas-phase polymerization processes may involve a chain-transfer agent, so as to control the melt index of the polymer to be produced. The chain-transfer agent employed may be hydrogen, which is introduced in a quantity that can range up to 90% and preferably lies between 0.01 and 60 mol % of the combined olefin and hydrogen delivered to the reactor.

In the examples which follow, the characteristics of the polymers have been determined by the following techniques:

- the HI was determined by measuring the percentage by weight of polymer which is insoluble in boiling heptane, in the polymer in question. This is done by extraction of the soluble fraction with boiling heptane for two hours in an apparatus of Kumagawa type;
- in the case of polypropylene, the melt index at 230° C. under 2.16 kg load was determined according to ASTM standard D 1238, method L. It is expressed in grams of polymer flowing over 10 minutes and is denoted by "$MI_2$" in the tables;
- in the case of polyethylene, the melt index at 190° C. under 2.16 kg load was determined according to ASTM standard D 1238, method E. It is expressed in grams of polymer flowing over 10 minutes and is denoted by "$MI_2$" in the tables;
- the product efficiency is calculated by dividing the mass of polymer obtained by the mass of solid catalyst component employed;
- the molecular mass distribution was determined by steric exclusion chromatography, using an analytical system similar to that described in the following reference: D. Lecacheux et al., Journal of Applied Polymer Science, Vol. 27, 4867 (1982). The calculations were made from molecular masses originating from a polystyrene calibration and corrected by virtue of the Mark-Houwink laws. Masses lower than 2000 were truncated.

Example 1 a) Preparation of a support 30 g of commercial anhydrous $MgCl_2$, 4.5 g of 1,2,4,5-tetramethylbenzene and 200 ml of tetrahydrofuran (THF) are introduced into a 300-ml reactor purged with nitrogen and provided with a mechanical paddle stirrer and a temperature control by means of a jacket. The temperature is raised to 60° C. and stirring is continued for 16 hours. The solid is then filtered off and washed 3 times with 100 ml of hexane to 60° C. for 15 minutes with each 100 ml of hexane, and then dried under a stream of nitrogen for two hours. 54.2 g of a solid containing 11.7% by weight of magnesium and 54.3% by weight of THF are recovered.

b) Preparation of a catalyst component 13.6 g of the support obtained in a), 44 ml of toluene and 133 ml of pure $TiCl_4$ are introduced at 50° C. into a 300-ml reactor purged with nitrogen and provided with a stirrer rotating at 100 revolutions per min. The temperature is raised to 90° C. and 0.67 ml of di-n-butyl phthalate (DBP) is then introduced. This mixture is left to react for two hours. After filtration a second series of treatments is carried out, which consists in performing the following five times in succession: 18 ml of $TiCl_4$ and 160 ml of toluene are added to the resultant solid, the temperature is raised to 100° C. for 1 hour and filtration is then carried out. The solid is next washed 3 times with 150 ml of hexane at 60° C. for 10 minutes. The solid is finally dried for two hours under a stream of nitrogen at 60° C. The catalyst component contains 3.7% by weight of titanium, 20.9% by weight of magnesium and 4.3% by weight of di-n-butyl phthalate.

c) Polymerization in the presence of the catalyst component

The following are introduced at 30° C., in this order, into a 3.5-liter stainless steel reactor provided with magnetic stirring and temperature control by means of a jacket: 1.2 Sl of hydrogen, 2.4 liters of liquid propylene, 24 millimoles of triethylaluminium and 2.4 millimoles of cyclohexylmethyldimethoxysilane (CHMDMS).

The reaction is allowed to take place for 10 minutes and then 20 mg of the catalyst component prepared in b) are injected into the reactor. The temperature is raised to 70° C. over 10 min and maintained at this value for one hour. The reactor is next cooled to the ambient temperature and the pressure lowered to the atmospheric pressure. 490 grams of a powder with an isotacticity value of 92.4% by weight are recovered.

The characteristics of the catalyst component obtained and those of the polymers obtained are collated in Table 1.

Example 2

The procedure is as in Example 1, except that 89 ml of toluene and 89 ml of $TiCl_4$ are introduced during the first treatment of the support.

The results are listed in Table 1.

Example 3

The catalyst component synthesized in Example 2 is tested in polymerization in the conditions of Example 1 except that cyclohexylmethyldimethoxysilane is replaced with the same quantity of dicyclopentyldimethoxysilane (DCPDMS). The quantity of hydrogen used is 2.45 Si in this case.

The results are listed in Table 1.

Example 4

The procedure is as in Example 1.
The results are listed in Table 1.

Example 5

The catalyst component synthesized in Example 4 is tested in polymerization in the conditions of Example 3. The quantity of hydrogen used in 2.45 Si in this case.

The results are listed in Table 1.

Comparative Example 1

The procedure is as in Example 1 except that 3.8 ml of di-n-butyl phthalate are introduced during the preparation of the catalyst component.

The results are listed in Table 1.

Comparative Example 2

The procedure is as in Example 1 except that 2.2 ml of di-n-butyl phthalate are introduced during the preparation of the catalyst component.

The results are listed in Table 1.

Comparative Example 3

The procedure is as in Comparative Example 2 except that 9 ml of $TiCl_4$ and 169 ml of toluene are introduced during the second series of treatments of the catalyst component.

The results are listed in Table 1.

Comparative Example 4

The procedure is as in Comparative Example 2 except that 124 ml of toluene and 53 ml of $TiCl_4$ are introduced during the first treatment of the support.

The results are listed in Table 1.

Example 6

The procedure is as in Example 1 except that di-n-butyl phthalate is replaced with 0.4 ml of diethyl phthalate (DEP) during the preparation of the catalyst component.

The results are listed in Table 2.

Example 7

The catalyst component synthesized in Example 6 is tested in polymerization in the conditions of Example 3. The quantity of hydrogen used is 3.5 Sl in this case.

The results are listed in Table 2.

Comparative Example 5

The procedure is as in Example 6 except that 1 ml of diethyl phthalate is introduced during the preparation of the catalyst component.

The results are listed in Table 2.

Example 8 a) Preparation of a support 2.5 kg of commercial anhydrous $MgCl_2$, 370 g of 1,2,4,5-tetramethylbenzene and 15 kg of tetrahydrofuran (THF) are introduced into a 120-liter reactor purged with nitrogen and provided with a mechanical paddle stirrer and temperature control by means of a jacket. The temperature is raised to 60° C. and stirring is continued for 12 hours. The solid is next filtered off and washed 4 times with 15 liters of hexane at 60° C. for 15 minutes, and then dried. The solid obtained contains 11.8% by weight of magnesium and 53% by weight of THF.

b) Preparation of a catalyst component

A first treatment is carried out on all of the solid obtained above by introducing 14 kg of toluene and 84 kg of pure $TiCl_4$ at 25° C. The temperature is raised to 95° C. over one hour and 290 g of di-n-butyl phthalate are then introduced. The treatment continues for 2 hours. After filtration, a second series of treatments is carried out, which consists in carrying out the following five times in succession: 11 kg of $TiCl_4$ and 51 kg of toluene are added to the resulting solid, the temperature is raised to 105° C. for 1 hour and filtration is carried out. The solid is next washed 4 times with 30 liters of hexane at 65° C. for 15 minutes. The solid is finally dried for 5 hours under a stream of nitrogen at 70° C. The catalyst component takes the form of a dusty powder of controlled particle size and morphology. The catalyst component contains 3.7% by weight of titanium, 18.3% by weight of magnesium and 4.1% by weight of di-n-butyl phthalate.

c) Polymerization in the presence of the catalyst component

The following are introduced at 30° C., in this order, into an 8-liters stainless steel reactor provided with magnetic stirring and a temperature control by means of a jacket: 1.6 Sl of hydrogen, 6 liters of liquid propylene, 30 millimoles of triethylaluminium and 3 millimoles of cyclohexylmethyldimethoxysilane (CHMDMS).

Reaction is allowed to take place for 10 minutes and then 40 mg of the catalyst component prepared in b) are injected into the reactor. The temperature is rapidly raised to 70° C. and maintained at this value for one hour. The reactor is next cooled to the ambient temperature and the pressure lowered to the atmospheric pressure.

The results are listed in Table 3.

Example 9

The procedure is as in Example 8 except that cyclohexylmethyldimethoxysilane is replaced with the same quantity of dicyclopentyldimethoxysilane (DCPDMS). The quantity of hydrogen used is 3.2 Sl in this case.

The results are listed in Table 3.

Example 10

The procedure is as in Example 8 except that the polymerization is carried out at 62° C. The quantity of hydrogen used is 1.6 Sl in this case.

The results are listed in Table 3.

Example 11

The procedure is as in Example 10 except that CHMDMS is replaced with the same quantity of DCPDMS. The quantity of hydrogen used is 3.2 Sl in this case.

The results are listed in Table 3.

Example 12

Example 8 is repeated.

The results are listed in Table 3.

Example 13

The procedure is as in Example 12 except that CHMDMS is replaced by the same quantity of DCPDMS. The quantity of hydrogen used is 3.2 Sl in this case.

The results are listed in Table 3.

Example 14

The procedure is as in Example 12 except that CHMDMS is replaced with the same quantity of phenyltriethoxysilane (PTES). The quantity of hydrogen used is 1.6 Sl in this case.

The results are listed in Table 3.

Example 15

The procedure is as in Example 12 except that CHMDMS is replaced with the same quantity of diisobutyldimethoxysilane (DiBDMS). The quantity of hydrogen used is 3.2 Sl in this case.

The results are listed in Table 3.

Comparative Example 6

The procedure is as in Example 12 except that 660 g of di-n-butyl phthalate are introduced during the preparation of the catalyst component.

The results are listed in Table 3.

Comparative Example 7

The procedure is as in Comparative Example 6 except that CHMDMS is replaced with the same quantity of dicyclopentyldimethoxysilane (DCPDMS). The quantity of hydrogen used is 8 Sl in this case.

The results are listed in Table 3.

Example 16 a) Preparation of a support

Into a stirred reactor thermostatted at 40° C. and purged with nitrogen are introduced 50 ml of a solution of $MgCl_2$ in n-butanol (BuOH) such that the $BuOH/MgCl_2$ molar ratio is 10. 200 ml of a paraffinic oil with a viscosity of 0.2 Pa s measured at 20° C. are added. Stirring is increased to a speed such that the linear velocity at the paddle end is 120 m/s. The two-phase mixture is left stirred for 5 minutes and then 125 ml of 1,4-dioxane are added rapidly in one lot. The precipitation of the $MgCl_2$-dioxane complex is immediate. After filtering, washing with hexane and drying under a stream of nitrogen, approximately 14 g of a dusty white powder are recovered, the composition of which is 67% by weight of 1,4-dioxane and 33% by weight of $MgCl_2$. This solid is next treated with a solution of triethylaluminium in toluene so that the Al/1,4-dioxane molar ratio is 2 and the aluminium concentration 1 mole per liter. After filtering, repeated washing with hexane and drying of the solid, a powder whose morphology is preserved is obtained. 4.5 g of the solid thus obtained are suspended in 50 ml of hexane at 40° C. 6 ml of tetrahydrofuran are then injected at a rate of 30 ml/h with stirring at 200 revolutions per min. After the injection of THF the solution is left to stand for 15 minutes with slow stirring. Filtration is next carried out, followed by 4 washings with hexane. The solid is dried for 1 hour under a stream of nitrogen at 70° C. 8 g of a solid containing 14.5% by weight of magnesium and 43.2% by weight of THF are recovered.

b) Preparation of a catalyst component

The 8 g of the support obtained in a), 20 ml of toluene and 58 ml of pure $TiCl_4$ are introduced into a 300-ml reactor purged with nitrogen and provided with a stirrer rotating at 200 revolutions per minute. The temperature is raised to 90° C. and then 0.16 ml of di-n-butyl phthalate are introduced. The treatment continues for 2 hours. After filtering, a second series of treatments is carried out, which consists in carrying out the following four times: 4 ml of $TiCl_4$ and 76 ml of toluene are added to the resulting solid, the temperature is raised to 100° C. for 1 hour and filtration is carried out. The solid is next washed 3 times with 80 ml of hexane at 60° C. for 10 minutes. The solid is finally dried for 2 hours under a stream of nitrogen at 60° C. The catalyst component is in the form of a dusty powder of controlled particle size and morphology. The catalyst component contains 3.7% by weight of titanium, 20.3% by weight of magnesium and 2.2% by weight of di-n-butyl phthalate.

c) Polymerization in the presence of the catalyst component

The following are introduced at 30° C., in this order, into a 3.5-liter stainless steel reactor provided with magnetic stirring and temperature control by means of a jacket: 0.7 Sl of hydrogen, 2.4 liters of liquid propylene, 24 millimoles of triethylaluminium and 2.4 millimoles of cyclohexylmethyldimethoxysilane (CHMDMS).

Reaction is allowed to take place for 10 minutes and then 20 mg of the catalyst component prepared above are injected into the reactor. The temperature is rapidly raised to 70° C. and maintained at this value for one hour.

At the end of the reaction the reactor is cooled and the pressure lowered to the atmospheric pressure. 304 grams of a powder with an isotacticity value of 92.6% by weight are recovered.

The results are listed in Table 4.

Comparative Example 8

The procedure is as in Example 16 except that 1.04 ml of di-n-butyl phthalate are introduced during the preparation of the catalyst component.

The results are listed in Table 4.

Example 17 a) Preparation of a support 20 g of commercial anhydrous $MgCl_2$ are introduced into a stainless steel ball mill of 400-ml working capacity, purged with nitrogen. The material is ground for 6 hours with the aid of balls of diameter varying from 6 to 16 mm and 175 g in total weight. 15 g of the solid thus obtained are suspended in 165 ml of hexane at 40° C. 60 ml of tetrahydrofuran are then injected at a rate of 30 ml/h with stirring at 200 revolutions per minute. After the injection of THF the solution is left to stand for 15 minutes with slow stirring. Filtration and 4 washings with hexane are next carried out. The solid is dried for 1 hour under a stream of nitrogen at 70° C. 28.7 g of a solid containing 10.8% by weight of magnesium and 44.6% by weight of THF are recovered.

b) Preparation of a catalyst component

The 8 g of the solid treated above, 26 ml of toluene and 78 ml of pure $TiCl_4$ are introduced into a 300-ml reactor purged with nitrogen and provided with a stirrer rotating at 200 revolutions per minute. The temperature is raised to 90° C. and then 0.81 ml of di-n-butyl phthalate are introduced. The treatment is continued for 2 hours. After filtering, a second series of treatments is carried out, which consists in carrying out the following five times in succession: 10.5 ml of $TiCl_4$ and 93.5 ml of toluene are added to the resulting solid, the temperature is raised to 100° C. for 1 hour and filtration is carried out. The solid is next washed 3 times with 80 ml of hexane at 60° C. for 10 minutes. The solid is finally dried for 2 hours under a stream of nitrogen at 60° C. The catalyst component is in the form of a dusty powder. The catalyst component contains 3.1% by weight of titanium, 21% by weight of magnesium and 5.2% by weight of di-n-butyl phthalate.

c) Polymerization in the presence of the catalyst component

The following are introduced at 30° C., in this order, into a 3.5-liter stainless steel reactor provided with a magnetic stirrer and temperature control by means of a jacket: 1.2 Sl of hydrogen, 2.4 liters of liquid propylene, 24 millimoles of triethylaluminium and 2.4 millimoles of cyclohexylmethyldimethoxysilane (CHMDMS).

After a precontact of 10 minutes 20 mg of the catalyst component prepared above are injected into the reactor. The temperature is raised rapidly to 70° C. and maintained at this value for one hour.

At the end of the reaction the reactor is cooled and the pressure lowered to the atmospheric pressure. 647 grams of a powder with an isotacticity value of 94.6% by weight are recovered.

The results are listed in Table 5.

Comparative Example 9

The procedure is as in Example 17 except that 1.36 ml of di-n-butyl phthalate are introduced during the preparation of the catalyst component.

The results are listed in Table 5.

Example 18

The catalyst component prepared in Example 12 is used in a polymerization of ethylene in the conditions which follow.

1.5 liters of hexane are introduced under a nitrogen atmosphere and at ambient temperature into a 4-liter reactor provided with temperature control and a stirring system, followed by 2.8 ml of triisobutylaluminium (TIBA) and then 1 ml of a suspension in hexane of 7 mg of the catalyst component of Example 16.

The reactor is pressurized with 2 bars of nitrogen and its temperature is then raised to 75° C. 4 bars of hydrogen and 7 bars of ethylene are then introduced. The pressure is kept constant by continuous addition of ethylene for 3 hours, after which the injection of ethylene is stopped and the reactor is cooled to 25° C. The polymer is deactivated by adding an acidic solution of methanol. After filtering and drying at 80° C., the polymer is recovered.

The results are listed in Table 6.

Example 19

The procedure is as in Example 18 except that the polymerization was carried out at 85° C.

The results are listed in Table 6.

Comparative Example 10

The procedure is as in Example 18 except that the solid catalyst component of Comparative Example 6 is employed. The results are listed in Table 6.

Comparative Example 11

The procedure is as in Example 19 except that the solid catalyst component of Comparative Example 6 is employed. The results are listed in Table 6.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 1

| Example No. | Ti (weight %) | Mg (weight %) | Diester nature | Diester weight % | THF weight % | Silane | Efficiency (g/g) | HI (weight %) | $MI_2$ (g/10 min) | Mw (g/mole) | Mw/Mn | Mz/Mw |
|---|---|---|---|---|---|---|---|---|---|---|---|---|
| 1 | 3.7 | 20.9 | DBP | 4.3 | 0.6 | CHMDMS | 24 500 | 92.4 | 1.9 | 375 000 | 6.2 | 3.4 |
| 2 | 2.7 | 18.7 | DBP | 4.9 | 0.4 | CHMDMS | 35 500 | 94.1 | 3.1 | 335 000 | 5.9 | 3.2 |
| 3 | 2.7 | 18.7 | DBP | 4.9 | 0.4 | DCPDMS | 47 800 | 96.7 | 1.6 | 389 000 | 6.1 | 3.2 |
| 4 | 3.7 | 20.9 | DBP | 4.8 | 0.66 | CHMDMS | 29 300 | 92.6 | 3.8 | 314 000 | 6.2 | 3.3 |
| 5 | 3.7 | 20.9 | DBP | 4.8 | 0.66 | DCPDMS | 42 600 | 94 | 3.1 | 339 000 | 6.4 | 3.3 |
| comparative 1 | 2.1 | 20.5 | DBP | 9.2 | 0.1 | CHMDMS | 44 300 | 98.3 | 2.1 | 356 000 | 4.7 | 2.6 |
| comparative 2 | 2.0 | 19.8 | DBP | 6.2 | 0.2 | CHMDMS | 45 000 | 99.3 | 3.6 | 306 000 | 5.0 | 2.9 |
| comparative 3 | 1.9 | 18.6 | DBP | 6.2 | 0.1 | CHMDMS | 41 200 | 98.4 | 1.9 | 377 000 | 4.5 | 2.6 |
| comparative 4 | 1.25 | 19.9 | DBP | 11 | 0.2 | CHMDMS | 34 600 | 92.3 | 3.8 | 299 000 | 4.6 | 2.9 |

TABLE 2

| Example No. | Ti (weight %) | Mg (weight %) | Diester nature | Diester weight % | THF weight % | Silane | Efficiency (g/g) | HI (weight %) | $MI_2$ (g/10 min) | Mw (g/mole) | Mw/Mn | Mz/Mw |
|---|---|---|---|---|---|---|---|---|---|---|---|---|
| 6 | 2.8 | 19 | DEP | 6.3 | 0.34 | CHMDMS | 30 600 | 91.9 | 3.5 | 322 000 | 5.8 | 3.2 |
| 7 | 2.8 | 19 | DEP | 6.3 | 0.34 | DCPDMS | 39 700 | 95.3 | 2.9 | 346 000 | 6.6 | 3.5 |
| comparative 5 | 2.2 | 21.1 | DEP | 12 | 0.2 | CHMDMS | 40 000 | 97.8 | 2.2 | 350 000 | 4.8 | 2.9 |

TABLE 3

| Example No. | Ti (weight %) | Mg (weight %) | Diester nature | Diester weight % | THF weight % | Silane | Efficiency (g/g) | HI (weight %) | $MI_2$ (g/10 min) | Mw (g/mole) | Mw/Mn | Mz/Mw |
|---|---|---|---|---|---|---|---|---|---|---|---|---|
| 8 | 3.7 | 18.3 | DBP | 4.1 | 0.55 | CHMDMS | 29 500 | 89.7 | 3.5 | 316 000 | 6.0 | 3.2 |
| 9 | 3.7 | 18.3 | DBP | 4.1 | 0.55 | DCPDMS | 41 100 | 91.9 | 2.4 | 362 000 | 7.1 | 3.3 |
| 10 | 3.7 | 18.3 | DBP | 4.1 | 0.55 | CHMDMS | 26 800 | 88.5 | 3.8 | 311 000 | 6.1 | 3.2 |
| 11 | 3.7 | 18.3 | DBP | 4.1 | 0.55 | DCPDMS | 37 700 | 89.5 | 3.1 | 343 000 | 6.8 | 3.2 |
| 12 | 3.6 | 21.1 | DBP | 4.4 | 0.5 | CHMDMS | 24 000 | 88.4 | 3.8 | 327 000 | 6.2 | 3.2 |
| 13 | 3.6 | 21.1 | DBP | 4.4 | 0.5 | DCPDMS | 32 400 | 93 | 3.4 | 350 000 | 7.7 | 3.6 |
| 14 | 3.6 | 21.1 | DBP | 4.4 | 0.5 | PTES | 22 000 | 82 | 5.6 | 305 000 | 6.4 | 3.8 |
| 15 | 3.6 | 21.1 | DBP | 4.4 | 0.5 | DiBDMS | 33 000 | 87.2 | 5.3 | 302 000 | 6.2 | 3.6 |
| comparative 6 | 2.4 | 18.8 | DBP | 8 | 0.2 | CHMDMS | 38 000 | 97.5 | 4.2 | 285 000 | 4.8 | 2.9 |
| comparative 7 | 2.4 | 18.8 | DBP | 8 | 0.2 | DCPDMS | 54 000 | 98.2 | 4.2 | 286 000 | 5.2 | 3.0 |

TABLE 4

| Example No. | Ti (weight %) | Mg (weight %) | Diester nature | Diester weight % | THF weight % | Silane | Efficiency (g/g) | HI (weight %) | $MI_2$ (g/10 min) | Mw (g/mole) | Mw/Mn | Mz/Mw |
|---|---|---|---|---|---|---|---|---|---|---|---|---|
| 16 | 3.7 | 20.3 | DBP | 2.2 | 1.6 | CHMDMS | 15 200 | 92.6 | 2.2 | 355 000 | 5.7 | 3.2 |
| comparative 8 | 1.9 | 21.4 | DBP | 10.7 | 0.1 | CHMDMS | 40 200 | 98 | 2.8 | 321 000 | 5.1 | 3.0 |

TABLE 5

| Example No. | Ti (weight %) | Mg (weight %) | Diester nature | Diester weight % | THF weight % | Silane | Efficiency (g/g) | HI (weight %) | $MI_2$ (g/10 min) | Mw (g/mole) | Mw/Mn | Mz/Mw |
|---|---|---|---|---|---|---|---|---|---|---|---|---|
| 17 | 3.1 | 21 | DBP | 5.2 | 0.34 | CHMDMS | 32 350 | 94.6 | 3.7 | 324 000 | 5.7 | 3.2 |
| comparative 9 | 1.9 | 20.9 | DBP | 8.3 | 0.18 | CHMDMS | 40 000 | 97.7 | 3.4 | 323 000 | 5 | 3.0 |

TABLE 6

| Example No. | Ti (weight %) | Mg (weight %) | Diester nature | Diester weight % | THF weight % | Efficiency (g/g) | $MI_2$ (g/10 min) | Mw (g/mole) | Mw/Mn | Mz/Mw |
|---|---|---|---|---|---|---|---|---|---|---|
| 18 | 3.6 | 21.1 | DBP | 4.4 | 0.5 | 42 500 | 0.17 | 193 500 | 6.1 | 3.5 |
| 19 | 3.6 | 21.1 | DBP | 4.4 | 0.5 | 47 200 | 0.64 | 111 000 | 6.6 | 3.7 |
| comparative 10 | 2.4 | 18.8 | DBP | 8 | 0.2 | 34 600 | 0.3 | 175 700 | 4.7 | 2.9 |
| comparative 11 | 2.4 | 18.8 | DBP | 8 | 0.2 | 47 200 | 0.55 | 117 000 | 4.4 | 3.0 |

What is claimed is:

1. A solid catalyst for polymerization of olefins comprising titanium atoms and a diester of phthalic acid on a $MgCl_2$ support;

said titanium being present in a proportion of 2.5 to 5% by weight;

said diester of phthalic acid being a dibutylphthalate and present in a proportion of 3 to 7% by weight: and said $MgCl_2$ being present in a proportion of at least 60 % by weight;

wherein the polymerization of olefins in a single reactor provides polymers or copolymers having a $M_z/M_w$ greater than 3 and a $M_w/M_n$ greater than 5.5, and wherein the polymerization of olefins originating from at least one monomer and containing at least three carbon atoms provides polymers or copolymers having an HI index ranging from 85 to 97% by weight.

2. A solid catalyst for polymerization of olefins consisting of a titanium compound, a dibutylphthalate and optionally a Lewis base not forming part of the class of the diesters, on a $MgCl_2$ support;

said titanium of the titanium compound being present in a proportion of 2.5 to 5% by weight, said dibutylphthalate being present in a proportion of 3 to 7% by weight, said Lewis base being present in a proportion of up to 8% by weight of the catalyst and being tetrahydrofurane or dioxane, said $MgCl_2$ being present in a proportion of at least 60% by weight;

wherein the polymerization of propylene in the presence of dicyclopentyldimethoxysilane in a single reactor with said solid catalyst provides polymers having a $M_z/M_w$ greater than 3 and a $M_w/M_n$ greater than 5.5, and an HI index ranging from 85 to 97% by weight.

3. A process for the manufacture of the olefin polymerization catalyst according to claim 1 consisting essentially of:

contacting $MgCl_2$ with a complexing solvent to produce a ($MgCl_2$.complexing solvent) complex with the molar ratio of the complexing solvent to $MgCl_2$ being higher than 4, and then washing with another solvent;

contacting (i) said ($MgCl_2$.complexing solvent) complex, the molar ratio of complexing solvent to $MgCl_2$ being between 1 and 2, (ii) a titanium compound, and (iii) a diester of phthalic acid having hydrocarbon groups in the ester functional groups that are identical or different and contain from one to eight carbon atoms.

4. The process of claim 3 wherein the complexing solvent is tetrahydrofuran, and wherein said another solvent is selected from the group consisting of aliphatic, alicyclic and aromatic hydrocarbons.

5. Process for the polymerization of at least one olefin in the presence of a solid catalyst component of claim 2 and of a cocatalyst.

6. Process according to claim 5, wherein the cocatalyst is an organic aluminium derivative.

7. Process according to claim 6, wherein the polymerization is carried out in the presence of a silane of formula $SiR^1R^2R^3R^4$ in which at least one of the groups bonded to silicon is an alkoxy group of formula (—$OR^5$) in which $R^5$ denotes a linear saturated hydrocarbon group containing from 1 to 4 carbon atoms and, the other groups bonded to silicon being hydrocarbon groups containing from 1 to 8 carbon atoms, at least one of these groups containing at least four carbon atoms.

8. Process according to claim 7, wherein the silane contains two alkoxy groups of formula (—$OR^5$) which may be identical or different.

9. Process according to claim 8, wherein the silane contains at least one cyclopentyl radical.

10. Process according to claim 9, wherein the silane is dicyclopentyldimethoxysilane.

11. Process according to claim 7, wherein the Al/Si molar ratio is between 5 and 200.

12. Process according to claim 5, wherein at least one olefin is propylene.

13. Process according to claim 12, wherein only propylene is polymerized.

14. Process according to claim 5, wherein at least one olefin is ethylene.

15. Process according to claim 14, wherein only ethylene is polymerized.

16. Process according to claim 7, wherein the linear saturated hydrocarbon group contains 1 or 2 carbon atoms.

17. Process according to claim 11, wherein the molar ratio is between 10 and 80.

18. A solid catalyst for polymerization of olefins comprising titanium atoms and a dibutylphthalate on a $MgCl_2$ support; said catalyst being obtained by contact between:

a ($MgCl_2$.complexing solvent) complex a titanium compound a dibutylphthalate;

said titanium being present in a proportion of 2.5 to 5% by weight;

said dibutylphthalate being present in a proportion of 3 to 7% by weight; and said $MgCl_2$ being present in a proportion of at least 60 % by weight;

wherein the polymerization of propylene in the presence of dicyclopentyldimethoxysilane in a single reactor with said solid catalyst provides polymers or copolymers having a $M_z/M_w$ greater than 3 and a $M_w/M_n$ greater than 5.5 and an HI index ranging from 85 to 97% by weight.

19. The catalyst according to claim 18, wherein the molar ratio of completing solvent to $MgCl_2$ is between 1 and 2.

20. The catalyst according to claim 19, wherein the molar ratio of completing solvent to $MgCl_2$ is between 1.4 and 1.7.

21. The catalyst according to claim 19, wherein the complex is obtained by bringing $MgCl_2$ and the complexing solvent into contact, the molar ratio of the complexing solvent to $MgCl_2$ being greater than 4, and then washing with another solvent.

22. The catalyst according to claim 21, wherein the contact is made with a molar ratio of completing solvent to $MgCl_2$ which is higher than 7.

23. The catalyst according to claim 21, wherein said another solvent is selected from aliphatic, alicyclic and aromatic hydrocarbons.

24. The catalyst according to claim 18, wherein the complexing solvent is tetrahydrofuran.

25. A solid catalyst for polymerization of olefins, said catalyst being made by the steps comprising:

(a) contacting $MgCl_2$ with a complexing solvent to produce a ($MgCl_2$.complexing solvent) complex with the molar ratio of the complexing solvent to $MgCl_2$ being greater than 4, and then washing with another solvent;

(b) contacting (i) said ($MgCl_2$.complexing solvent) complex, with the molar ratio of complexing solvent to $MgCl_2$ being between 1 and 2, (ii) a titanium compound selected from the group consisting of chlorine compounds of titanium having the formula of Ti—(OR)$_x$Cl$_{4-x}$ in which R denotes an aliphatic or aromatic hydrocarbon radical containing from 1 to 14 carbon atoms or denotes $COR^1$ with $R^1$ denoting an aliphatic or aromatic hydrocarbon radical containing from 1 to 14 carbon atoms, and x denotes an integer ranging from 0 to 3, and (iii) a dibutylphthalate;

(c) the titanium atoms of said titanium compound being present in a proportion of 2.5 to 5% by weight, said dibutylphthalate being present in a proportion of 3 to 7% by weight, and said $MgCl_2$ being present in a proportion of at least 60% by weight; and (d) recovering said solid catalyst;

wherein the polymerization of propylene in the presence of dicyclopentyldimethoxysilane in a single reactor with said solid catalyst provides polymers or copolymers having a $M_z/M_w$ greater than 3 and a $M_w/M_n$ greater than 5.5 and an HI index ranging from 85 to 97% by weight.

26. The solid catalyst of claim 25, wherein the complexing solvent is dioxane or tetrahydrofuran, and wherein said another solvent is selected from the group consisting of aliphatic, alicyclic and aromatic hydrocarbons.

27. The solid catalyst of claim 25, wherein the Mg is obtained from a compound selected from the group having the formula $Mg(OR^2)_n Cl_{2-n}$ in which $R^2$ denotes hydrogen or a linear or cyclic hydrocarbon radical and n denotes an integer ranging from 0 to 2.

28. The solid catalyst according to claim 25, further comprising a Lewis base present in a proportion of 0.01 to 8% by weight.

29. The solid catalyst according to claim 28, wherein the Lewis base is tetrahydrofuran.

30. The solid catalyst according to claim 29, wherein tetrahydrofuran is present in a proportion of 0.3 to 1.0% by weight.

31. The solid catalyst according to claim 25, wherein said complexing solvent is tetrahydrofuran.

32. A process for making a solid catalyst for polymerization of olefins, said catalyst being made by the steps comprising:
   (a) contacting $MgCl_2$ with a complexing solvent to produce a ($MgCl_2$.complexing solvent) complex with the molar ratio of the complexing solvent to $MgCl_2$ being greater than 4, and then washing with another solvent;
   (b) contacting (i) said ($MgCl_2$.complexing solvent) complex, with the molar ratio of complexing solvent to $MgCl_2$ being between 1 and 2, (ii) a titanium compound selected from the group consisting of chlorine compounds of titanium having the formula of $Ti$—$(OR)_x Cl_{4-x}$ in which R denotes an aliphatic or aromatic hydrocarbon radical containing from 1 to 14 carbon atoms or denotes $COR^1$ with $R^1$ denoting an aliphatic or aromatic hydrocarbon radical containing from 1 to 14 carbon atoms, and x denotes an integer ranging from 0 to 3, and (iii) a dibutylphthalate;
   (c) the titanium atoms of said titanium compound being present in a proportion of 2.5 to 5% by weight, said dibutylphthalate being present in a proportion of 3 to 7% by weight, and said $MgCl_2$ being present in a proportion of at least 60% by weight; and
   (d) recovering said solid catalyst;
   wherein the polymerization of propylene in the presence of dicyclopentyldimethoxysilane in a single reactor with said solid catalyst provides polymers or copolymers having a $M_z/M_w$ greater than 3 and a $M_w/M_n$ greater than 5.5 and an HI index ranging from 85 to 97% by weight.

33. The solid catalyst of claim 25, wherein the solid catalyst consists of a titanium compound, a dibutylphthalate and optionally up to 8% by weight of tetrahydrofurane or dioxane, on a $MgCl_2$ support.

34. The process of claim 33, wherein the solid catalyst consists of a titanium compound, a dibutylphthalate and optionally up to 8% by weight of tetrahydrofurane or dioxane, on a $MgCl_2$ support.

35. A process of polymerization of at least one olefin comprising contacting of at least one olefin under reaction conditions with the solid catalyst of claim 25 and a cocatalyst.

36. The process of claim 35 wherein the polymerization of olefins originating from at least one monomer and containing at least three carbon atoms provides polyomers or copolymers having an HI index ranging from 85 to 97% by weight.

37. The process of claim 36 wherein the polymerization is carried out in the presence of a silane of formula $SiR^1R^2R^3R^4$ in which at least one of the groups bonded to silicon is an alkoxy group of formula (—$OR^5$) in which $R^5$ denotes a linear saturated hydrocarbon group containing from 1 to 4 carbon atoms, the other groups bonded to silicon being hydrocarbon groups containing from 1 to 8 carbon atom, at least one of these groups containing at least four carbon atoms.

38. The process of claim 37 wherein a single silane is introduced during polymerization, and wherein polymerization is carried out in a single reactor.

* * * * *